United States Patent [19]

Ishii et al.

[11] Patent Number: 4,773,583
[45] Date of Patent: Sep. 27, 1988

[54] SOLDERING DEVICE

[75] Inventors: Ginya Ishii, Tokorozawa; Yoshihiro Miyano, Sayama, both of Japan

[73] Assignees: Tamura Kaken Co., Ltd., Saitama; Hitachi Ltd.; Tamura Corporation, both of Tokyo, all of Japan

[21] Appl. No.: 940,418

[22] Filed: Dec. 11, 1986

[51] Int. Cl.⁴ .............................................. B23K 3/06
[52] U.S. Cl. ...................................... 228/37; 118/429
[58] Field of Search ............. 228/36, 37, 180.1, 180.2; 118/429

[56] References Cited

U.S. PATENT DOCUMENTS

| | | | |
|---|---|---|---|
| 4,315,590 | 2/1982 | Kondo | 228/37 |
| 4,465,014 | 8/1984 | Bajka | 228/37 |
| 4,465,219 | 8/1984 | Kondo | 228/37 |
| 4,530,457 | 7/1985 | Down | 228/37 |
| 4,545,520 | 10/1985 | Kent | 228/37 |
| 4,568,016 | 2/1986 | Payne | 228/37 |
| 4,632,291 | 12/1986 | Rahn | 228/37 |

FOREIGN PATENT DOCUMENTS

| | | | |
|---|---|---|---|
| 0227360 | 9/1985 | Fed. Rep. of Germany | 228/37 |
| 5516725 | 7/1978 | Japan . | |

Primary Examiner—Kurt Rowan
Attorney, Agent, or Firm—Birch, Stewart, Kolasch & Birch

[57] ABSTRACT

A soldering device wherein the article to be soldered is moved into contact with molten solder which flows in the direction counter to the direction of movement of said article is characterized by including a nozzle for flowing said molten solder and a flow path of a channel shape provided contiguous thereto for circulating said molten solder flowed out of said nozzle, said flow path having side-wall plates which are vertically adjustable.

18 Claims, 3 Drawing Sheets

SOLDERING DEVICE

BACKGROUND OF THE INVENTION

1. Field of the Invention

The present invention relates to a soldering device or unit and, more particularly, to such a device or unit designed to prevent defects of soldering (hereinafter called the soldering defects) which may otherwise occur when separating the article to be soldered from molten solder flowing out of a nozzle.

2. Statement of the Prior Art

There are known flow type soldering units including a solder bath containing a molten solder material and nozzles adapted to flow out the molten solder material. For instance, such soldering units are widely used when the leads of electrical parts are soldered to soldering lands on the circuit patterns of printed circuit boards (hereinafter referred to as the printed boards) so as to mount the electrical parts on the printed boards.

As illustrated in FIG. 3, one typical example of the flow type soldering units includes a solder bath 1 provided therein with a metallic nozzle 2, out of which molten solder is permitted to flow by means of a built-in impeller. When it is intended to apply solder to one, shown at a, of the aforesaid printed boards using this unit, that board is carried into the flowing molten solder, with its leading end being slightly upward, to come into contact with the solder. Then, the printed board a is successively advanced at the same attitude to allow the molten solder to come into contact with its entire surface.

In order to bring the printed board into satisfactory contact with the molten solder flowing out of the nozzle, the nozzle is provided with wave-rectifying plates 2b and 2c of metal on both sides of its aperture 2a, as viewed in the direction of advancement or forward movement of the printed board, said rectifying plates serving to wave-rectify the flowing molten solder. One type of such wave-rectifying plates is of the so-called oneway-flow structure wherein one wave-rectifying plate 2b, in the direction which the printed board a enters, is arranged with its end inclining downwardly, and the other wave-rectifying plate 2c, in the direction which the printed board a leaves, is constructed from a horizontal piece and a vertical end piece, as illustrated in FIG. 3 as an example. With the wave-rectifying plate combination of this type, the molten solder flows down immediately along the wave-rectifying plate 2b. However, the molten solder does not immediately flow down along the wave-rectifying plate 2c, and is stagnated thereon for a while in the form of an approximately laminar flow. For that reason, in comparison with a nozzle 2' provided on both sides of its aperture with downwardly inclining wave-rectifying plates 2'b and 2'c in FIG. 4, the soldering defects are more difficult to occur, such as "icicles" hanging pieces of solder-occuring when solder on the portion to be soldered separates from a flow of molten solder or "solder bridges" formed by the contact of solder on adjacent portions to be soldered.

Even with the arrangement as mentioned above, however, it is impossible to eliminate completely the occurrence of soldering defects. For instance, one of these causes is that a drop of the temperature of the molten solder stagnating on the wave-rectifying plate 2c for some time is unavoidable for reason of the fact that the molten solder is exposed to the open air for a longer period of time, compared with the molten solder that flows down immediately. In one typical case, there is a temperature drop of as large as 10° C. from 250° C. that is the temperature of the as-flowed molten solder. Under that situation, the printed board — its one side being applied with a flux and pre-heated to 100° to 140° C. and its other side being at a temperature of 80° to 100° C. — comes into contact with the solder of 250° C. on the rectifying plate 2b, but only contacts the solder of 240° C., about 10° C. lower temperature on the wave-rectifying plate 2c. At the time when the portion to be soldered separates from the lower temperature molten solder after contacted the higher temperature molten solder, the temperature of the printed board per se is considerably lower than 240° C. so that when solder on the portion to be soldered are detached from a flow of molten solder, their cut ends decrease considerably in temperature and tail off. This may give rise to either the "icicles" or the "solder bridges" due to the contact of adjacent mounted molten solder. Such soldering defects caused by the "icicles" or the "solder bridges" have to be corrected by hand work, and pose a problem in view of working efficiency.

SUMMARY OF THE INVENTION

First object of the present invention is to prevent the occurrence of soldering defects such as the "icicles" or "solder bridges", when molten solder is permitted to flow out of a nozzle and applied to the article to be soldered.

Second object of the present invention is to realize the control of a flow rate of molten solder with a view to preventing the occurrence of the "icicles" or "solder bridges".

Third object of the present invention is to remove solder oxides occurring in a flow of molten solder to prevent them from contacting the article to be soldered and thereby give no adverse effect upon soldering performance.

Fourth object of the present invention is to avoid the oxidation of the circulated molten solder in such a manner that the overflowed molten solder may be allowed to flow down onto the surface of the molten solder in the bath in little turbulence state.

Fifth object of the present invention is to prevent the occurrence of the "icicles" or the "solder bridges", when soldering is applied to the article which is to be soldered thereon in close intervals, such as, for instance, a printed board.

Sixth object of the present invention is to give the device in which the articles to be soldered are automatically soldered with no or little soldering defects to improve the reliability and productivity thereof by achieving the 1st to 5th objects as mentioned above.

DETAILED DESCRIPTION OF THE INVENTION

According to the present invention, the foregoing objects are achieved by the provision of a soldering device or unit wherein the article to be soldered is moved into contact with molten solder which flows in the direction counter to the direction of movement of said article, which device or unit is characterized by including a nozzle for flowing out said molten solder and a flow path of a channel shape provided contiguous to said nozzle for flowing said molten solder flowing out of said nozzle, said flow path including side-wall plates which are vertically adjustable.

The present invention is applicable to any soldering device including a nozzle, the aperture size of which is variable, and a flow path of a channel shape and having vertically adjustable side-wall plates so as to make its cross-sectional area variable. Preferred to this end is the so-called counterflow contact type soldering devices wherein the article to be soldered is moved into contact with molten solder which flows in the direction counter to the direction of movement thereof. In one embodiment of such a soldering device, molten solder is permitted to flow out of a nozzle, and then flows through a path extending horizontally or downwardly at an angle with respect to said nozzle.

When the article to be soldered such as printed circuit board is carried by means of a conveyor into contact with molten solder flowing in the direction counter to the direction of movement of that article, the portion of the article to be soldered is wetted with the molten solder. When the printed board is further carried on the conveyor and separates from the molten solder, the molten solder on the portion to be soldered are detached from the flow of molten solder. In this case, however, their cut-off ends align in the direction of the flow of molten solder with no chance of contact, so that no "bridges" occurs, because the flow of molten solder is counter to the direction of movement of the printed board. To achieve this more effectively, a molten solder flow rate of at least 15 cm/second, preferably 15 to 40 cm/second is applied at a position where the molten solder on the portion to be soldered are detached from the flow of molten solder. A particularly most preferable flow rates ranges from 18 to 28 cm/second. It is preferred that the flow of molten solder in the flow path comes to a laminar flow, because a turbulent flow of molten solder may results in the occurrence of the "solder bridges". A molten solder flow rate of up to 15 cm/second may also result in the occurrence of the aforesaid "solder bridges".

To permit the flow rate of molten solder to fall within the range as mentioned above may be achieved by adjusting the size of the aperture of the nozzle or varying the revolutions of a molten solder circulating motor to regulate the amount of molten solder flowed out of nozzle. However, this may also be achieved by controlling the cross-sectional area of the flow path of a channel shape. In the latter case, the height of both side-wall plates defining part of that flow path may be controlled to regulate the amount of molten solder flowed. It is then possible to flow the molten solder over the side-wall plates. In comparison with the case where the molten solder is not permitted to overflow, overflowing of molten solder prevents decreasing of the flow rate of molten solder due to friction with the side-wall plates. Hence, it is unlikely that the surface of that molten solder portion may be oxidized. Since oxides of solder, if any, are overflown together with the molten solder without being left within the flowing path, it is very unlikely that they may be trapped in the soldered portion of the article to be soldered, thus incurring soldering defects. As the article to be soldered contacts the flow of molten solder, that flow is obstacled. However. Overflowing of molten solder makes it possible to keep the constant level of the molten solder and hence the constant amount of solder fed to the portion to be soldered. In this connection, it may rather be preferable to provide a plate for rectifying an overflowing stream of molten solder, since any turbulence is prevented from occurring in the flow of molten solder in the flow path, and, when molten solder overflows into the solder bath, the overflowing stream is prevented from either having a fair chance of leading to oxidation of molten solder by air due to its turbulence or striking vigorously upon and stirring up the surface of molten solder contained in the bath.

As mentioned in the foregoing, of importance in the present invention is the flow rate of molten solder at the position where the printed board is detached from the flow of molten solder. However, as the printed board contacts the molten solder which is at a temperature of 240 to 250° C., it warps toward the molten solder in the convex form, and increases in the area of contact with the molten solder, so that a certain degree of bend occurs in the position where the soldered portion separates from the molten solder, when comparing with an unwarped board. In this case, the flow rate of molten solder at the thus displaced position should be regulated to that in the range as already mentioned. It is preferred to this end that the flowing path has a length of 50 to 300 mm. For instance, a length of at least 100 mm is preferred for the printed boards for VTR. The reason why the flowing path is required to have such a length is that, as a result of the fact that the printed board warps upon contacting the molten solder and the article to be soldered approaches the nozzle aperture when separating from the molten solder, there is a decrease in the flow rate of molten solder at the position where the molten solder on the soldered portion separate from the flowing molten solder, so that difficulty is encountered in obtaining a flow rate of 15 cm/second as mentioned above. A excessively increased flow rate tends to make the flow of solder turbulent and is therefore unpreferred, although it may cause an increase in the flow rate in the vicinity of the aperture. The reason why the flow rate is decreased on the upper control plate side in this manner is that there is an increase in the cross-sectional area for the flowing-out of molten solder and a friction of molten solder to the upper control plate.

ACTION AND EFFECT OF THE INVENTION

According to the soldering device of the present invention wherein the flowing path contiguous to the aperture of the nozzle is channelled and includes the vertically adjustable side-wall plates, it is possible to overflow the molten solder from the plates depending upon the flow rate of molten solder through the flow path in a state where the article to be soldered such as a printed board is brought into counterflow contact with the molten solder, whereby, when the printed board separates from the molten solder, the cut ends of solder on the soldered portion thereof are controlled by the flow of molten solder to prevent their connection to form "solder bridges", and keep the constant level of solder fed to the portion to be soldered, while removing from the flow path solder oxides easy to be formed on the sides of the side-wall plates.

In particular, since the flow path provided contiguous to the aperture of the nozzle is made variable to control the flow rate of molten solder, and the flow path is designed to have a length of at least 50 mm, the article to be soldered such as a printed board can be brought into counterflow contact with the molten solder at an easily controlled flow rate of, e.g., 15 cm/second or higher. Thus, when the printed board separates from the molten solder, the cut-off ends of solder on the soldered portion thereof are controlled by the flow of molten solder to prevent their connection to form "solder bridges".

According to the present invention, it is thus possible to adjust the height of the side-wall plates of the flow path depending upon the amount of molten solder flowing out of the nozzle, whereby the flow rate of molten solder through the flow path can constantly be controlled. In addition, the solder oxides, if any, can always be removed from the flow path by overflowing the molten solder to prevent them from being trapped in the soldered portion. This serves to reduce soldering defects in cooperation with the prevention of the occurrence of the "solder bridges". It is thus possible to improve the reliability of soldered articles and the productivity of soldering.

EMBODIMENTS OF THE INVENTION

Figure 1:
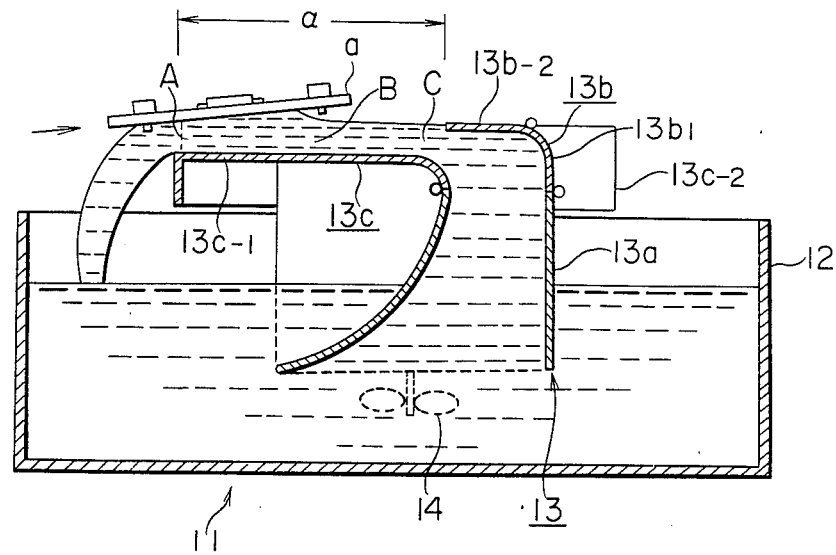
FIG. 1 is a schematical section view illustrating one embodiment of the soldering device according to the present invention.

One embodiment of the present invention will now be explained with reference to FIGS. 1 and 2.

A soldering device shown generally at 11 includes a solder bath 12 and a nozzle 13 provided therein. Molten solder stored in the bath 12 is permitted to flow out of the nozzle 13 by means of an impeller 14 driven by a motor which is not illustrated.

The nozzle 13 includes a nozzle body 13a which is of an elongated rectangular shape in cross-section, and is spread out toward the rear bottom in the longitudinal section. The nozzle body 13a is provided with an aperture-control plate 13b along its front edge and with a flow path of a channel shape along its rear edge, said path having both side-wall plates. The aperture-control plate 13b comprises a lower control piece 13b-1 which is bent and rotatably mounted on the front edge of the nozzle body 13a, and an upper control piece 13b-2 in the form of a flat plate, which is rotatably mounted on the lower control piece. Control of the range of rotation of these pieces causes control of the aperture of the nozzle 13 and hence the amount of molten solder flowing out of that aperture.

The flow path 13c is defined by a bottom plate 13c-1 which has a length alpha ($\alpha$) of 100 to 200 mm as measured from the aperture of the nozzle and is rotatably mounted on the rear edge of the nozzle body 13a, and side-wall plates 13c-2 and 13c-3 which are attached by means of screws 13a-3 and 13a-4 (not shown) to mounting plates 13a-1 and 13a-2 (not shown) extending from both side plates of the nozzle body 13a, and are adjustable in its height with respect to the bottom plate 13c-1. It is understood that, in order to hold the upper and lower control pieces 13b-2, 13b-1 and the bottom plate 13c-1 at their rotating positions, use may be made of various means. For instance, although not illustrated, threaded rods are provided on the sides of the aforesaid side-wall mounting plates, and are held in the place by means of nuts.

The first embodiment of the soldering device operates as follows.

Figure 2:
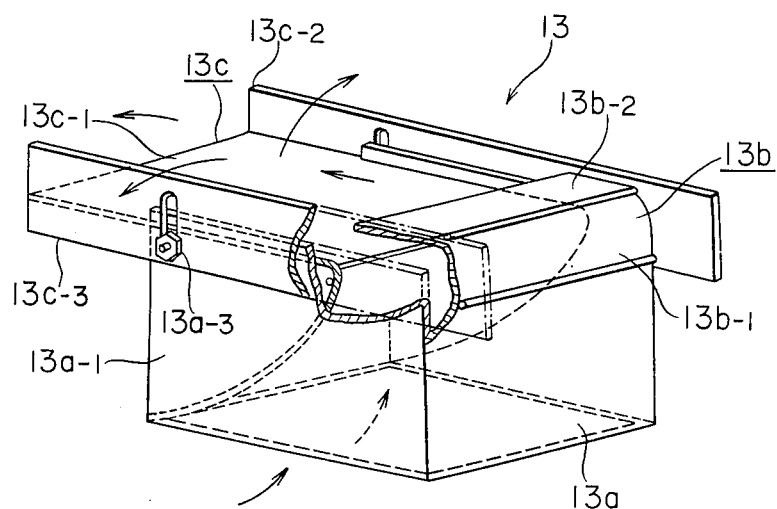
FIG. 2 is a partly cut-away, perspective view illustrating the soldering device used in that embodiment.

As illustrated in FIG. 1, the bottom plate 13c-1 is kept substantially horizontal, and the upper edges of the side-wall plates 13c-2 and 13c-3 are positioned, thereby defining the flow path 13c. The upper control piece 13b-2 is positioned along the upper edges of the side-wall plates 13c-2 and 13c-3 of the flow path 13c.

The impeller 14 is then operated to permit the molten solder of about 250° C. to flow out of the nozzle 13. The molten solder is permitted to flow through the aperture defined by the aperture-control plate 13b and the flow path 13c, and flows down onto the solder bath 12 from its extreme end. At that time, the height of the side-wall plates 13c-2 and 13c-3 is adjusted to allow the molten solder to overflow therefrom. In this state, a conveyor, not shown, is operated to carry a printed circuit boards a with its leading end being slightly lifted up, which has previously been fluxed and heated. As the board contacts the flowing molten solder, it is warped due to the heat thereof, but is wetted therewith at the portion required for soldering. Then, the printed board is further conveyed and detached from the flow of molten solder. In this case, the flow rate of molten solder at the detachment position is adjusted to 18 to 28 cm/second by controlling the positions of the aperture-control plate 13b, bottom plate 13c-1 and side-wall plates 13c-2 and 13c-3 to allow the molten solder to come to a laminar flow, whereby the cut-off tails of molten solder on the portion to be soldered are oriented in the direction of the flow of molten solder, and their endmost positions are torn off and carried away by the molten solder. As disclosed in Japanese Patent Application No. 59(1984)-203661, the flow rate of molten solder is determined by immersing the blades of an impeller in the flow of molten solder and rotating the impeller to measure the revolutions thereof.

The printed board is soldered in this manner. However, since the bottom plate of the flow path is designed to have a length of 100 to 200 mm, the position at which the soldered portion separates from the molten solder is spaced away from the upper control plate 13b-2, even though the printed board warps. For that reason, the flow of molten solder can be maintained at the flow rate as mentioned above. When the molten solder is allowed to flow and circulated in this manner, the molten solder overflows the side-wall plates due to the arrangement wherein they are positioned on the same level as the upper control piece, the surface solder oxides' films, in particular, the solder oxides' films occurring in a slow-flowing portion of molten solder in the vicinity of the upper control plate, are removed from flow path 13c, resulting in more satisfactory soldering. It is noted that, if the upper control piece 13b-2 is positioned at a level lower than the side-wall plates 13c-2 and 13c-3, then an amount of molten solder will remain on the side of the upper control piece and be easily oxidized there.

The solder oxides may be removed in this manner. It is noted, however, that complete removal of the oxides is achieved by allowing the molten solder to overflow the side-wall plates. This is because, since the molten solder flows more slowly over the zone extending from both sides of the endmost edge of the upper control piece 13b-2 to both side-wall plates, a relatively large amount of the solder oxides occurring in that zone is carried away with the overflowing stream. It is also noted that, although the counterflow contact of the printed board with the molten solder may obstacle the flow of molten solder and cause expansion of molten solder, an excessively lifted-up portion of molten solder, if any, is allowed to flow down along with the overflowing stream to adjust automatically its height and suppress fluctuations in the level of molten solder. Consequently, the occurrence of soldering defects such as the "solder bridges" is prevented without overfeeding the solder to the portion to be soldered. The solder oxides, if any, float on the surface of molten solder and easily flow with the overflowing molten solder, and are thus removed from the flow path.

If the flow rate of molten solder flowing through the flow path is increased in the foregoing embodiment, the height of both side-wall plates thereof may then be re-adjusted for re-overflowing. Too high an overflow rate is unpreferred, since another flow occurs in the direction normal to the flow direction of solder through the flow path. Hence, care should be taken to prevent the overflow rate from becoming excessively high.

It is appreciated that, although not illustrated, the present invention includes a flow path which cuts off side wall plates on both sides of its rear end and also in which rear ends of bothside wall plates are adjusted to be equal or to be lower than the level of the bottom plate end by tilting the side wall plates or the bottom plate.

In the following, the results of experiments carried out with the first embodiment of the present invention will be explained by contrast with those of comparison experiments.

For experimentation, an automatic soldering device manufactured by Tamura Seisakusho K.K. was used under the following conditions.
Conveyor speed: 1.3 m/minute
Angle of inclination of conveyor: 7°
Temperature (pre-heating temperature of the surface to be soldered of printed circuit board pre-fluxed (Flux: Solderite CF-220V manufactured by Tamura Kaken K.K.) : 90° C.
Soldering temperature : 240° C.
Printed circuit board under test : VTR boards (2000 solidering spots per board)

Figure 3:
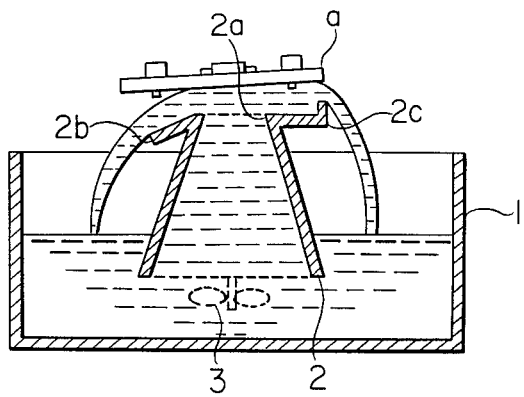
FIGS. 3 and 4 are schematical section views illustrating the prior art soldering device.
Figure 4:
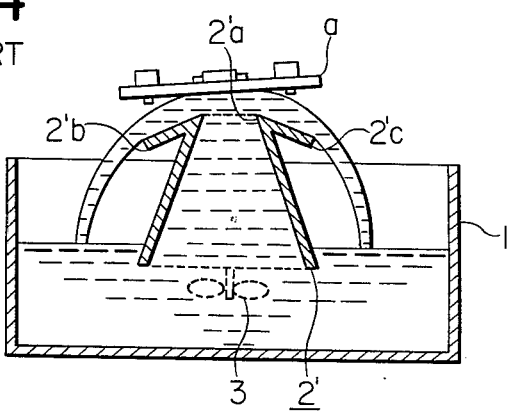

Under the conditions as mentioned above, soldering was carried out with the nozzle of FIG. 1 (the example of the present invention including the flow path having a length alpha ($\alpha$) of 170 mm), the nozzle of FIG. 3 (Comparison Example 1) and the nozzle of FIG. 4 (Comparison Example 2) to measure the number of the "solder bridges" occurred per board. The results are plotted in FIG. 5 with the type of the nozzles as abscissa. For the nozzle according to the example of the present invention, the test Nos. (a: overflowing and b: not overflowing) given in the following table were used. The values corresponding to these Nos. were obtained by measuring the flow rate of molten solder (in cm/second) passing through the flow path of the device according to the example of the present invention at Position A in FIG. 1 (the extreme end of the flow path), Position B in FIG. 1 (at which the soldered portion separates from the molten solder) and Position C in FIG. 1 (in the vicinity of the upper control plate) according to the procedures disclosed in Japanese Patent Application No. 59(1984)-203661. It is understood that the molten solder flowing out of the nozzles of Comparison Examples 1 and 2 was in the general solder-wave form.

TABLE

| | Flow rate of molten solder (cm/second) | | | | | | | |
|---|---|---|---|---|---|---|---|---|
| | Test No. | | | | | | | |
| | 1a | 1b | 2a | 2b | 3a | 3b | 4a | 4b |
| Position of measurement | | | | | | | | |
| A | 38 | 38 | 29 | 29 | 24 | 24 | 15 | 15 |
| B | 30 | 30 | 22 | 22 | 15 | 15 | 6 | 6 |
| C | 26 | 16 | 12 | 12 | 6 | 6 | 0 | 0 |
| Revolutions of motor (r.p.m.) | 600 | | 460 | | 420 | | 345 | |

Figure 5:
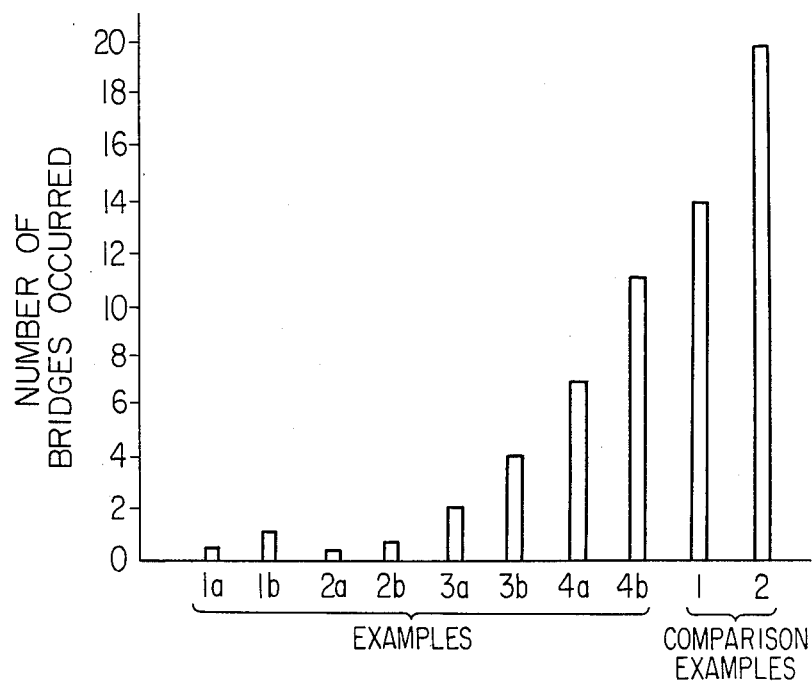
FIG. 5 is a graphical view showing the number of soldering defects occurred when soldering was carried out with the aforesaid soldering devices.

From the results of FIG. 5, it is found that the number of the "solder bridges" occurred was 4 or lower in the experiment runs where the device of the example according to the present invention was used at a flow rate of at least 15 cm/second at Position B, whereas it was 7 or higher in the experiment runs where the nozzles of the comparison examples wered used, and the device of the example according to the present invention was used at a flow rate of less than 15 cm/second at Position B. The number of the "solder bridges" occurred is smaller in the experiment runs where the molten solder was permitted to overflow than in those where the molten solder was not permitted to overflow.

Figure 6:
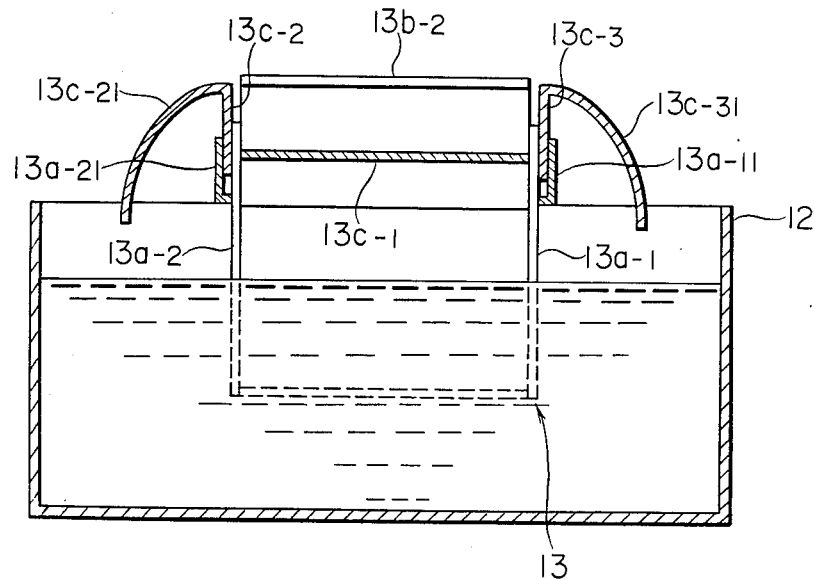
FIG. 6 is a front section view showing another embodiment of the soldering device according to the present invention.

In the first embodiment of the present invention, no modification is made with respect to the upper ends of the side-wall plates 13c-2 and 13c-3. As illustrated in FIG. 6 wherein same parts as in other Figures are shown by identical numerals, arcuate wave-rectifying plates 13c-21 and 13c-31 may be provided. In this embodiment, their height may be adjusted by means of nuts, as is the case with the first embodiment. As will be understood from FIG. 6, however, L-shaped pieces may be attached to the mounting plates 13a-1 and 13a-2 of the nozzle body 13a by fitting into grooves 13a-11 and 13a-21 in which such wave-rectifying plates are inserted and held with a frictional force.

By the provision of such wave-rectifying plates, it is always possible to overflow a portion of molten solder from the flow path without disturbing the flow of molten solder passing through the flow path and the overflowing stream per se. In addition, the molten solder contained in the solder bath is also not disturbed, since the overflowing stream flows gently down onto the surface thereof. In this manner, the oxidation of molten solder due to its noticeable contact with air is avoided.

It is understood that, in place of the bent wave-rectifying plates, flat wave-rectifying plates may be used at a given angle.

The length shown by alpha ($\alpha$) in FIG. 1 may be adjusted by increasing or decreasing the length of the endmost portion of the upper control plate 13b-2 (by the advancement or retraction of the overall position of the aperture-control plate 13b) or increasing or decreasing the height of the endmost portion of the bottom plate 13b-1 in a stepwise manner. Althernatively, it may be adjusted by an auxiliary retractable plate which is formed to fit into the flow path. It is also understood that the nozzle body 13a may be spread out one or both its aperture in longitudinal section.

Such modifications as mentioned just above may be applicable to the embodiment of FIG. 6.

What is claimed is:

1. A soldering device wherein an article to be soldered is moved into contact with molten solder which continuously flows in a direction counter to a direction of movement thereof comprising:
   a solder bath;
   a nozzle for flowing said molten solder comprising:
   a nozzle body being partially disposed within and projecting a predetermined distance from said solder bath;
   said nozzle body including a first, second and third wall affixed to each other and projecting from said solder bath and a curved wall affixed to said first and second walls and projecting from said solder bath at an incline towards said third wall;
   a bottom plate affixed to said curved wall and extending in a direction away from said third wall;
   side plates being spaced a predetermined distance apart and being adjustably connected to said bottom plate for forming an enlarged area flow path for molten solder;
   an aperture control plate being affixed to said third wall and extending in the same direction as said bottom plate for forming a channel shaped flow of molten solder in communication with said flow path formed by said bottom plate and said side-wall plates; and
   an impeller disposed within said solder bath for imparting movement to said molten solder to flow along said flow path.

2. A soldering device as claimed in claim 1, wherein molten solder is allowed to overflow said both side-wall plates of said flow path.

3. A soldering device as claimed in claim 1, wherein said flow path through which said molten solder flows is formed into a length of at least 50 mm, and, when said article to be soldered is brought into contact with and then detached from said molten solder, the flow rate of said molten solder flowing through a flow path at said detachment position is made variable by the size of an aperture of said nozzle and/or the cross-sectional area of said flow path.

4. A soldering device as claimed in claims 1 and 2, wherein the length of said flow path through which said solder flows is adjusted by an auxiliary retractable plate.

5. A soldering device as claimed in claim 1, wherein said flow rate of said molten solder at said position where said article to be soldered is detached from said molten solder is at least 15 cm/second.

6. A soldering device as claimed in claim 1, wherein said both side-wall plates are provided with wave-rectifying plates.

7. A soldering device as claimed in claim 1, wherein said article to be soldered comprises a given portion to be soldered in a printed circuit board and a lead or electrode of an electronic part.

8. A soldering device as claimed in claim 7, wherein a series of said articles to be soldered, each comprising an electronic part mounted on a printed board, are carried in by a conveyor.

9. A soldering device as claimed claim 3, wherein the length of said flow path through which said molten flows is adjusted by an auxiliary retractable plate.

10. A soldering device as claimed in claim 3, wherein said flow rate of said molten solder at said position where said article to be soldered is detached from said molten solder is at least 15 cm/second.

11. A soldering device as claimed in claim 4, wherein said flow rate of said molten solder at said position where said article to be soldered is detached from said molten solder is at least 15 cm/second.

12. A soldering device as claimed in claim 3, wherein said both side-wall plates are provided with wave-rectifying plates.

13. A soldering device as claimed in claim 4, wherein said both side-wall plates are provided with wave-rectifying plates.

14. A soldering device as claimed in claim 5, wherein said both side-wall plates are provided with wave-rectifying plates.

15. A soldering device as claimed in claim 3, wherein said article to be soldered comprises a given portion to be soldered in a printed circuit board and a lead or electrode of an electronic part.

16. A soldering device as claimed in claim 4, wherein said article to be soldered comprises a given portion to be soldered in a printed circuit board and a lead or electrode of an electronic part.

17. A soldering device as claimed in claim 5, wherein said article to be soldered comprises a given portion to be soldered in a printed circuit board and a lead or electrode of an electronic part.

18. A soldering device as claimed in claim 6, wherein said article to be soldered comproses a given portion to be soldered in a printed circuit board and a lead or electrode of an electronic part.

* * * * *